United States Patent

[11] 3,602,837

[72] Inventor John Goldsborough
San Jose, Calif.
[21] Appl. No. 24,294
[22] Filed Mar. 31, 1970
[45] Patented Aug. 31, 1971
[73] Assignee The United States of America as represented by the Secretary of the Army

[54] METHOD AND APPARATUS FOR EXCITING AN ION LASER AT MICROWAVE FREQUENCIES
12 Claims, 2 Drawing Figs.

[52] U.S. Cl. .................................................. 331/94.5, 333/99 PL
[51] Int. Cl. .................................................. H01s 3/09
[50] Field of Search .......................................... 331/94.5; 333/99 PL; 343/701

[56] References Cited
UNITED STATES PATENTS
2,648,768 8/1953 Woodward .................. 343/802
3,458,830 7/1969 Zeller et al. .................. 331/94.5

OTHER REFERENCES

Ahmed et al.: " Microwave Electron Cyclotron Resonance Pumping of a Gas Laser," Proc. IEEE, Vol. 52, pp. 1737–8, Dec. 1964.

Goldsborough: " Cyclotron Resonance Excitation of Gas-Ion Laser Transitions." APP. PHYS. LETT., Vol. 8, pp. 218–9, May 1966.

Primary Examiner—Ronald L. Wibert
Assistant Examiner—Edward S. Bauer
Attorneys—Harry M. Saragovitz, Edward J. Kelly, Herbert Berl and Jess J. Smith, Jr.

ABSTRACT: This invention relates to a method and apparatus for exciting a continuous wave, high energy density ion laser with microwave frequency power. The method involves the coupling of microwave excitation energy into a plasma which, due to its high conductivity, replaces what would normally be a metallic conductor. Power is transmitted from a magnetron via a waveguide, a directional coupler, and a tunable waveguide-to-coaxial transition unit or other equivalent transmission elements to a resonant structure enclosing the plasma tube. Sliding copper sleeves on the discharge tube are used to control standing wave patterns within the discharge conductor and to confine the discharge power, thereby eliminating the discharge in regions of the plasma tube, such as near the Brewster windows, where its presence limits the power output and/or lifetime of the laser.

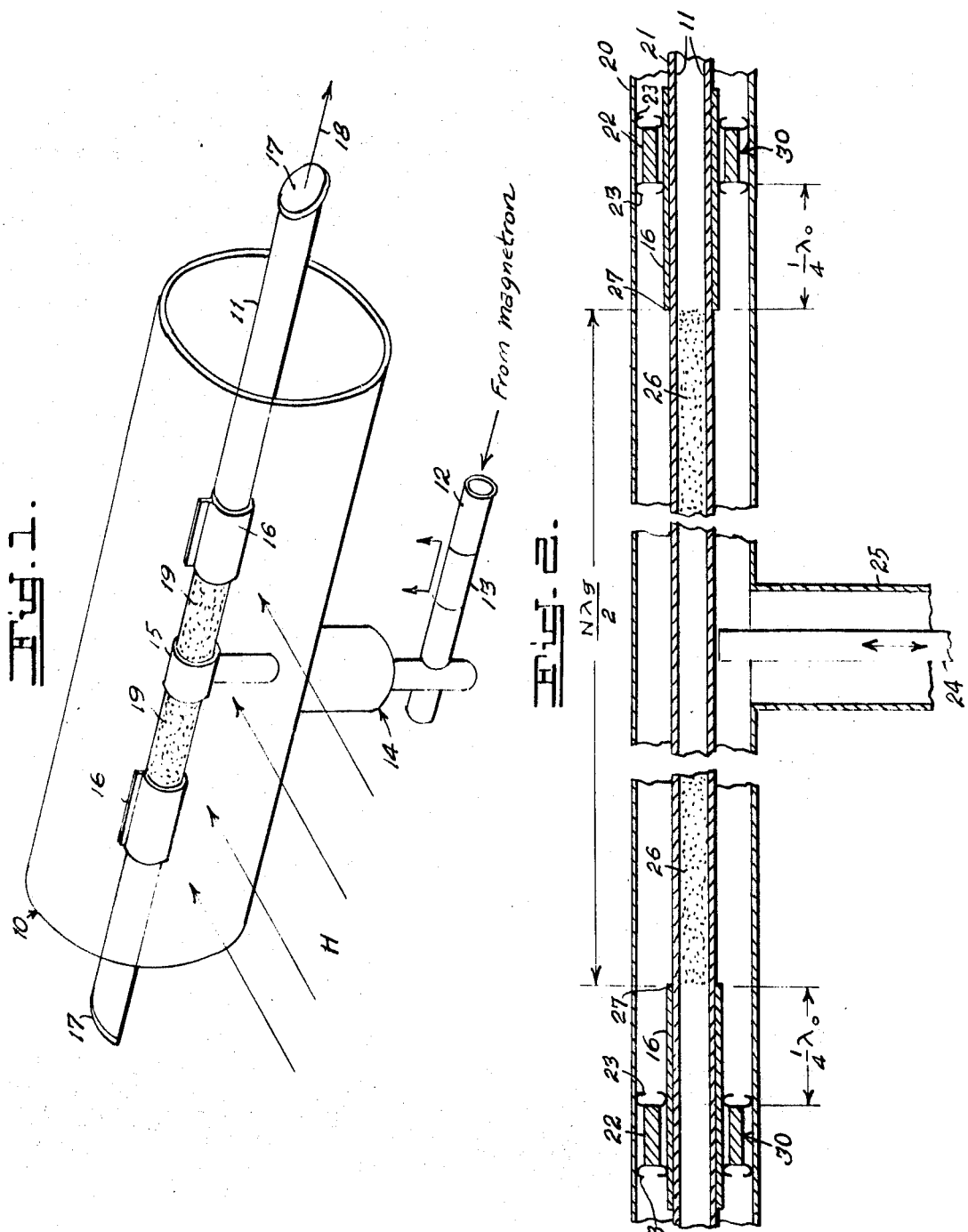
INVENTOR,
John P. Goldsborough

METHOD AND APPARATUS FOR EXCITING AN ION LASER AT MICROWAVE FREQUENCIES

BACKGROUND OF THE INVENTION

To obtain a population inversion and laser action in an ionized atom, one must excite the upper laser level which generally lies many electron volts above the atomic ground state. One of the processes by which the upper laser state can be excited is a collision with an electron which has been accelerated by an external electric field. To obtain these necessary high electron energies, the energy gained by an electron between collisions should be as large as possible. In DC fields and low frequency fields less than the collision frequency) the energy gain per collision is proportional to E/p ratios, where E is the electric field and p the pressure. Pulsed DC and RF discharges with high E/p ratios have been successfully used to produce ion laser action with relatively high efficiencies. However, it is not possible to obtain as high an E/p ration in a continuous discharge and the average energy gained per collision, and hence, the average electron energy is less. In a continuous discharge the average electron energy is roughly equal to the ionization potential of the neutral atom. Since this energy is not sufficient to excite the upper laser state, it is generally believed that a two-step excitation process takes place in CW discharges, both DC and low frequency RF. The cyclotron resonance excitation reported here provides a higher effective E/p ratio.

An electron in a magnetic field and an orthogonal alternating electric field at the cyclotron resonance frequency $f_c = eB/2m. = 2.8$ MHz./gauss will undergo a spiral motion and can absorb energy from the electric field for many microwave cycles. As the electron energy increases, the orbital radius increases according to $r = (2mE/eB^2)^{1/2}$ where $E$ is the electron energy in electron volts. For $E=35$ ev. and $B=1000$ gauss, $r=0.2$ mm., a value which is smaller than the discharge vessel and the mean free path at gas pressures of the order of 0.1 torr. The collision frequency at these pressures is smaller than the RF frequency as it must be in order for a cyclotron resonance not to be excessively broadened. The ability of a cyclotron resonance electron to continuously absorb an increasing amount of energy over many RF cycles up to the collision time contrasts with the behavior of an electron in no magnetic field which cannot absorb a net energy over one cycle unless it suffers a collision.

A cyclotron resonance frequency of about 3 GHz. is desirable. A lower frequency, e.g. 100 MHz, where one could use lumped circuit techniques, results in too large a particle orbit. A higher frequency would give smaller orbits and smaller waveguide components, but requires a higher magnetic field. The power required to produce a magnetic field increases with the square of field while the volume of field decreases only linearly with frequency. This factor coupled with the availability of inexpensive CW magnetron oscillators at 2450 MHz. makes this frequency particularly convenient.

Various methods have been employed to excite or pump lasers including pumping by microwave energy, of which this invention, as hereafter disclosed, is a significant improvement. Such prior art devices have generally been directed to pulsed systems and thus are not concerned with the same problems as in the CW plasma laser of the instant invention.

It is to the field of plasma lasers that this invention is related. More specifically, this invention is directed to CW ion lasers excited by microwave energy. In such devices it is desirable to couple as much energy into the lasing system as possible thereby enabling a maximum power transfer with as little loss as possible by spurious discharges or otherwise.

SUMMARY OF THE INVENTION

In the method and device of the microwave excited CW plasma laser herein disclosed, power is transmitted from a magnetron by a conventional waveguide and is passed through a dual directional coupler and from there to a tunable waveguide-to-coax transition unit. The transition unit contains tuning adjustments that enable it to match the magnetron to a range of impedances. A single band, connected to the center conductor of the coaxial output of the transition unit, encloses the center of the plasma discharge tube. Sliding copper sleeves on the discharge tubes are used to control standing wave patterns within the discharge conductor and to concentrate the discharge power within the region of high magnetic field. These sleeves effectively change the length of a coaxial cavity and hence, its frequency is varied. When the sliding sleeves are used for tuning the discharge, it is possible to match impedances so that less than 10 percent of the input power is reflected back toward the magnetron.

An external magnetic field is applied perpendicular to the axis of the laser tube and perpendicular to the nominal microwave electric field. The laser tube has Brewster windows at each end for coupling to a laser resonator in the usual fashion. Cooling is provided for in the high intensity part of the plasma tube.

In the device hereinabove described, the conductivity of the microwave excited gas discharge is sufficiently high that the discharge acts like the center conductor of a coaxial transmission line resonator. Various advantages from the use of plasma as a center conductor of a coaxial conductor, that is coaxial in the sense of one conductor effectively surrounding the other and not in the sense of concentric axes, are apparent including a more efficient and easier excitation than in an open resonator structure, such as a rectangular cavity. Other advantages include the use of copper sleeves to control standing wave patterns within the plasma tube and to concentrate the discharge power in the region of the high magnetic field. Other advantages will be apparent from the following description.

BRIEF DESCRIPTION OF THE DRAWING

The exact nature of this invention will be readily apparent from consideration of the following specification relating to the annexed drawings in which:

FIG. 1 shows a perspective view of the microwave excitation of the ion laser plasma tube of the invention.

FIG. 2 shows a more advanced coaxial plasma tube structure of the invention and showing the placement of the sliding copper sleeves employed as discharge stoppers.

DESCRIPTION OF THE PREFERRED EMBODIMENT

Referring now to the drawings wherein like reference characters designate like or corresponding parts throughout the views, there is shown in FIG. 1 an illustration of one embodiment of the instant invention with outer conductor 10 surrounding plasma tube 11, tube 11 being constructed of fused quartz. Outer conductor 10 is shown as being transparent for purposes of illustration however, conductor 10 is fabricated of a conducting metal such as copper and is thus not transparent.

Microwave energy is generated in a conventional CW magnetron, not shown. The magnetron employed as the microwave source may be of the type used in microwave ovens, and can deliver up to 1400 watts at 2450 MHz. The magnetron can be powered by a DC supply without filter capacitor giving it a duty cycle of about one in five and higher peak microwave power. CW operation is obtained with the addition of a filter. Magnetron efficiency is approximately 70 percent. The magnetron is coupled into waveguide 12 containing a dual directional coupler 13 for monitoring the power incident and reflected from the load.

Power is then transmitted to tunable waveguide to coaxial unit 14 which allows impedance matching over a large range of discharge conditions. A single conductive band 15 is connected to the center conductor of the waveguide to coaxial unit 14 and encircles plasma tube 11 thereby coupling energy into tube 11. Copper sleeves 16 are provided on the plasma tube 11 and are used to control standing wave patterns within the region of high magnetic field H. The field H may be obtained by any conventional means to maintain such field H perpendicular to the axis of the plasma tube 11.

Cooling is provided around plasma tube 11 by means of a jacket (not shown) of circulating chlorothene, a commercial cleaning solvent, chosen because it is relatively nonflammable, nontoxic, and inexpensive, in addition to having low dielectric losses. If higher microwave electric fields are employed, a lower dielectric loss fluid should be employed such as an inert flurocarbon.

Brewster windows 17 are employed to confine a noncirculating gas within plasma tube 11 and permit laser beam 18 to be emitted therefrom. Windows 18 are oriented at the Brewster angle. The optical cavity resonator is formed by conventional means, consisting of two spherical mirrors (not shown).

Various gases may be employed such as krypton, xenon, chlorine and mercury, but best lasing action was found in argon. Stable chlorine discharges were easily obtained and power outputs of 75 percent that of argon under similar conditions were obtained. In terms of power output chlorine is certainly the next best ion laser element after argon. One-fifth to one-third of the argon power output was obtained with Krypton, as is typical with other excitation means. Laser action was also obtained with He-Hg, however, only under pulsed conditions. With an unfiltered power supply the magnetron puts out several spikes when it first comes on. These spikes produced the pulses necessary for mercury laser action. A maximum output power of 100 milliwatts in five argon lines was obtained with this enclosed coaxial structure.

The region 19 of highly ionized gas (indicated in the case of argon by a bright blue discharge) can be changed by adjusting the sleeves 16. In general, blue gas is observed only in the region of high magnetic field H. A weaker discharge (primarily Ar I) is usually observed throughout the entire laser tube 11 and often down part of the vacuum manifold (not shown) surrounding tube 11 as well. This discharge dissipated only a small amount of the total power, however, only a small power is necessary to heat the discharge tube Brewster windows 17 excessively.

The tube 11 may be constructed in various diameters and lengths. In the device actually constructed tube 11 was tested with bore diameters of 2, 5, and 10 mm. and lengths of 15 cm. Ion laser action in ionized argon was observed in all three tubes. Ion laser action has possibly never before been obtained in a tube with as large a ratio of bore diameter to length as has been observed in the case of the 10-millimeter bore tube. For this particular tube, the estimated power input to the gas at threshold is on the order of 150 watts per cubic centimeter, which is considerably lower than the required threshold power density in a DC or low-frequency RF tube. The 2-millimeter bore tube, which is the most efficient, has produced 50 milliwatts total output in the various argon-ion laser lines for approximately 1 kilowatt of microwave power into the tube. The optimum pressure for high power operation was approximately 0.2 torr., depending as usual to some extent on the power input while the optimum magnetic field was about 1500 gauss.

Referring now to FIG. 2, there is shown the coaxial structure of the instant invention showing the discharge stoppers 30 and the placement of sliding copper sleeves 16 about plasma tube 11 utilized to overcome the problem of spurious discharges on Brewster windows 17 and down the vacuum manifold (not shown). Cooling liquid flows between wall 21 of plasma tube 11 and conductor 20. Two ring-shaped sliding plugs 22 are provided with conductive fingers 23 to bias sleeves 16 between outer coaxial conductor 20 and wall 21. Moveable probe 24 is provided for coupling adjustment between the coaxial feed line 25 from transition unit 14, as shown in FIG. 1, and the plasma tube 11.

Sleeves 16 are placed apart a distance of $N\lambda g/2$ where N is an integer and $\lambda g$ is the wavelength in a coaxial line with gas discharge center conductor herein disclosed. Plugs 22 are so located on sleeves so that the distance between where the fingers 23 contact sleeves 16 and the center end of sleeves 16 is $\frac{1}{4}\lambda o$ where $\lambda o$ is the free space wavelength. Since fingers 23 effectively short circuit sleeves 16, they are resonant and present a high impedance at their inward ends 27. Since the plasma discharge 26 is presented with a high impedance at ends 27, the current falls to a minimum and the discharge 26 is extinguished. If sleeves 16 are made ½ wavelength long, the impedance at the open end is low, there is a maximum of discharge intensity, and the discharge 26 goes through the stoppers 30 with maximum intensity.

It should be understood, of course, that the foregoing disclosure relates only to a preferred embodiment of the invention and that numerous modifications or alterations may be made therein without departing from the spirit and the scope of the invention as set forth in the appended claims.

What is claimed is:

1. A method of exciting a continuous wave, ion laser comprising the steps of:
   positioning a plasma tube concentrically within an electrically conductive structure, said plasma tube having Brewster windows at opposite ends thereof;
   exciting said plasma tube with microwave frequency power thereby producing a continuous wave, ion laser, and;
   controlling the standing wave patterns within said plasma tube, and thereby eliminating spurious discharges, by means of electrically conductive sleeves selectively positioned about said plasma tube.

2. A method of exciting an ion laser at microwave frequencies comprising the steps of:
   providing an electrically conductive, tubular conductor and disposing an electrically insulative tube concentrically within said conductor;
   fixing Brewster windows over the ends of said tube and thereby sealing a lasing medium within said tube;
   transferring microwave power into said tube by means of a waveguide-to-coaxial transition unit wherein the center conductor of the output of said unit is connected to a first sleeve that surrounds said tube thereby causing said medium to lase, and;
   positioning copper sleeves around said tube on either side of said first sleeve thereby controlling standing wave patterns within said tube and concentrating said discharge power between said copper sleeves.

3. A device for producing a continuous wave, ion laser comprising:
   means for containing a plasma medium;
   means, surrounding said containing means, for functioning as the outer conductor of a coaxial line;
   means for exciting said plasma medium with microwave frequency power thereby producing a continuous wave, ion laser, and;
   electrically conductive sleeves positioned around said containing means for controlling the standing wave pattern within said plasma tube thereby eliminating spurious discharges and enhancing the power output of said ion laser.

4. A device for producing a continuous wave, ion laser according to claim 3 and further comprising that:
   said containing means is a tube having Brewster windows at both ends.

5. A device for producing a continuous wave, ion laser according to claim 4, and further comprising that:
   said tube is constructed of fused quartz.

6. A device for producing a continuous wave, ion laser according to claim 5, and further comprising that:
   said surrounding means is an electrically conductive structure mounted concentric with respect to said containing means.

7. A device for producing a continuous wave, ion laser according to claim 6, and further comprising that:
   said exciting means includes a magnetron coupled to a directional coupler, a waveguide-to-coaxial transition unit, to a first sleeve surrounding said containing means.

8. A device for producing a continuous wave, ion laser according to claim 7, and further comprising that:

said sleeves are mounted about said tube in such a manner that the effective length of said sleeves is ¼λo, where λo is the free space wavelength of said microwave frequency, and that such sleeves are mounted apart from each other by a distance of N λg/2 where N is an integer and λg is the wavelength of said microwave frequency in a coaxial line with gas discharge center conductor.

9. A device for producing a continuous wave, ion laser according to claim 3, and further comprising that:
said surrounding means is an electrically conductive structure mounted concentric with respect to said containing means.

10. A device for producing a continuous wave, ion laser according to claim 3, and further comprising that:
said exciting means includes a magnetron coupled to a directional coupler, a waveguide-to-coaxial transition unit, to a first sleeve surrounding said containing means.

11. An apparatus for exciting a continuous wave, high-energy density ion laser with microwave frequency power, comprising:
a fused quartz plasma tube containing a lasing medium and having Brewster windows mounted at each end;
an electrically conductive resonant structure surrounding said plasma tube;
means for exciting said lasing medium including a magnetron coupled to a directional coupler, said coupler feeding a tunable waveguide-to-coaxial transition unit, said transition unit being coupled to said resonant structure and to said plasma tube thereby exciting said lasing medium and producing a continuous wave laser;
means for controlling said laser including electrically conductive metallic sleeves placed about said plasma tube, said sleeves being placed apart a distance of N λg/2, where N is an integer and λg is the wavelength of said microwave frequency in a coaxial gas discharge center conductor; and
means for electrically connecting said sleeves to said resonant structure thereby varying the effective width and wavelength of said sleeves, said means for electrically connecting being spring means for slidably biasing said sleeves between said tube and said resonant structure thereby enabling said sleeves to be positioned to control the standing wave pattern of said lasing medium and eliminating spurious discharges.

12. The apparatus according to claim 11, and further comprising that:
said sleeves are fabricated of copper and said plasma medium is argon, and;
means for cooling said plasma tube.